United States Patent [19]
Watson et al.

[11] 3,776,544
[45] Dec. 4, 1973

[54] AUTOMATIC LOADING APPARATUS

[75] Inventors: Donald W. Watson, Arlington Heights; Albert G. Enskat, Barrington, both of Ill.

[73] Assignee: Xerox, Inc., Stamford, Conn.

[22] Filed: Sept. 23, 1968

[21] Appl. No.: 761,515

[52] U.S. Cl. .................... 271/3, 214/6 D, 271/35, 271/75, 271/157, 271/DIG. 7
[51] Int. Cl. ............................................ B65g 60/00
[58] Field of Search ............... 214/6 D, 6 K, 6 H, 214/6.2, 6 S, 6 F, 8.5 G, 8.5, 17.62, 6 P; 271/68, 86, 3; 221/10

[56] References Cited
UNITED STATES PATENTS

| | | | |
|---|---|---|---|
| 2,133,260 | 10/1938 | Wolff | 214/6 F UX |
| 2,133,265 | 10/1938 | Wolff | 271/86 X |
| 2,347,391 | 4/1944 | Benning | 214/8.5 G X |
| 2,486,415 | 11/1945 | Huntar | 214/17.62 X |
| 2,843,061 | 7/1958 | Bonebrake | 214/6 D X |
| 2,889,073 | 6/1959 | Nogle | 221/10 |
| 3,022,999 | 2/1962 | Mead | 271/68 |
| 3,027,021 | 3/1962 | Kramer | 314/6 D X |
| 3,420,387 | 1/1969 | Baum | 271/86 X |
| 3,422,969 | 1/1969 | Miller et al. | 214/6 D |
| 3,463,330 | 8/1969 | Roberts | 271/86 X |
| 3,262,697 | 7/1966 | Krinke | 271/35 X |
| 3,522,943 | 8/1970 | Swanson | 214/6 |

FOREIGN PATENTS OR APPLICATIONS

| | | | |
|---|---|---|---|
| 1,031,848 | 6/1966 | Great Britain | 271/68 |

*Primary Examiner*—Robert J. Spar
*Attorney*—Norman E. Schrader, James J. Ralabate and Frederick E. McMullen

[57] ABSTRACT

An automatic loading apparatus designed to maintain supply of articles at the infeed station of an article processor; the apparatus including a supply conveyor for bringing articles which may be in the form of stacks forward; a shingling conveyor downstream of the supply conveyor for receiving articles from the supply conveyor, the shingling conveyor serving to rearrange any article stack thereon into shingled form and to transport the shingled articles in procession to the infeed station; and control means for operating the supply and shingling conveyors in response to the demand for articles at said infeed station whereby to maintain a stack-like supply of articles at the infeed station.

6 Claims, 4 Drawing Figures

INVENTORS
DONALD W. WATSON
ALBERT G. ENSKAT
BY
Frederick E. McMullen
ATTORNEY

AUTOMATIC LOADING APPARATUS

This invention relates to a loading apparatus, and more particularly, to an automatic loading apparatus.

In devices such as labeling machines which serve to affix labels to articles or pieces such as letters, magazines, etc., the operator is usually required to maintain the supply bin of the machine loaded. With the advent of high speed labeling machines, the speed at which the articles are processed is so high that almost constant operator attention is required to maintain the labeling machine supplied. While automatic loaders for supplying articles such as letters, magazines, etc. to high speed article processors, such as labeling machines, are known, the speed and dependability of many of the prior art loaders is so poor as to effectively rule out their use.

It is a principal object of the present invention to provide a new and improved article loading apparatus.

It is a further object of the present invention to provide a new and improved article supplying method.

It is an object of the present invention to provide high speed loading apparatus adapted to automatically maintain a supply of articles at the infeed station to an article processor.

It is a further object of the present invention to provide an automatic article loader adapted to accommodate an input of articles in stacks having means for de-stacking and transporting the articles to a work station and there re-stacking the articles for use.

It is an object of the present invention to provide an automatic loading apparatus adapted to maintain a stack of articles ready at a work station and incorporating means to jog the article stack into alignment.

The invention relates to an apparatus for maintaining a supply of articles at the infeed station of an article processor, comprising in combination, transport means for carrying articles forward to the infeed station; means adapted to maintain a predetermined supply of the articles at the infeed station, the supply maintaining means including means for actuating the transport means in response to a predetermined low article supply; and control means adapted to assure input of an uninterrupted stream of articles to the infeed station by the transport means, the control means including shingling means adapted to arrange the articles into predetermined overlapping relationship.

The invention further relates to a method of maintaining a supply of articles at the infeed station of an article processor having article supply means operatively associated therewith, the steps which consist in, monitoring the number of articles at the infeed station; actuating the supply means to bring articles forward to the infeed station when the supply of articles at the infeed station is at a predetermined low; assuring single file delivery of articles to the infeed station by the article supply means by re-arranging any articles which are stacked one atop the other into overlapping shingled relationship; stacking the articles at the infeed station one atop the other; and terminating actuation of the supply means and the step of stacking articles at the infeed station when the stack of articles at the infeed station reaches a predetermined high.

Other objects and advantages will be apparent from the ensuing description and drawings in which.

Figure 1:
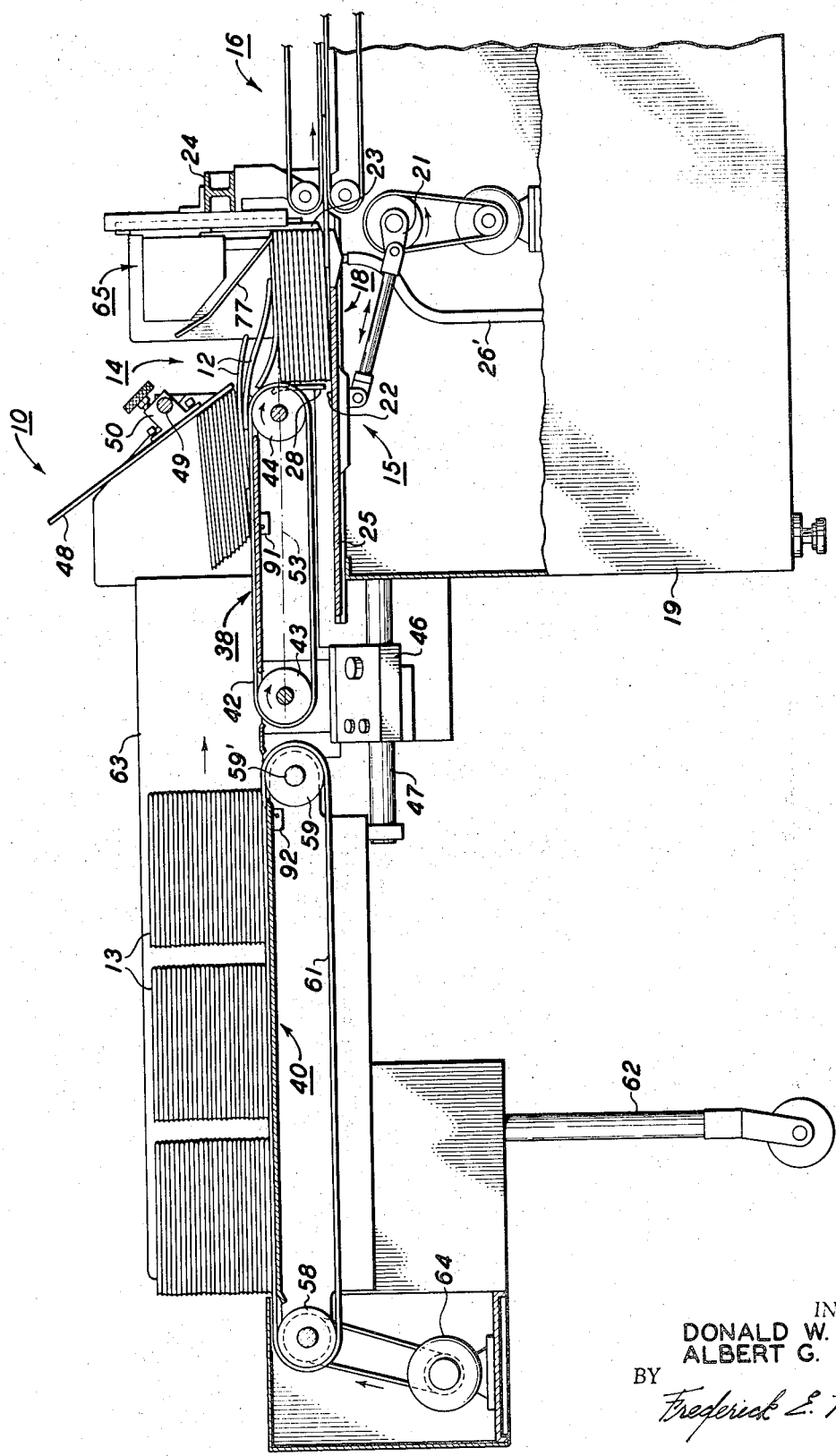
FIG. 1 is a side view partially in section showing the automatic loading apparatus of the present invention.
Figure 2:
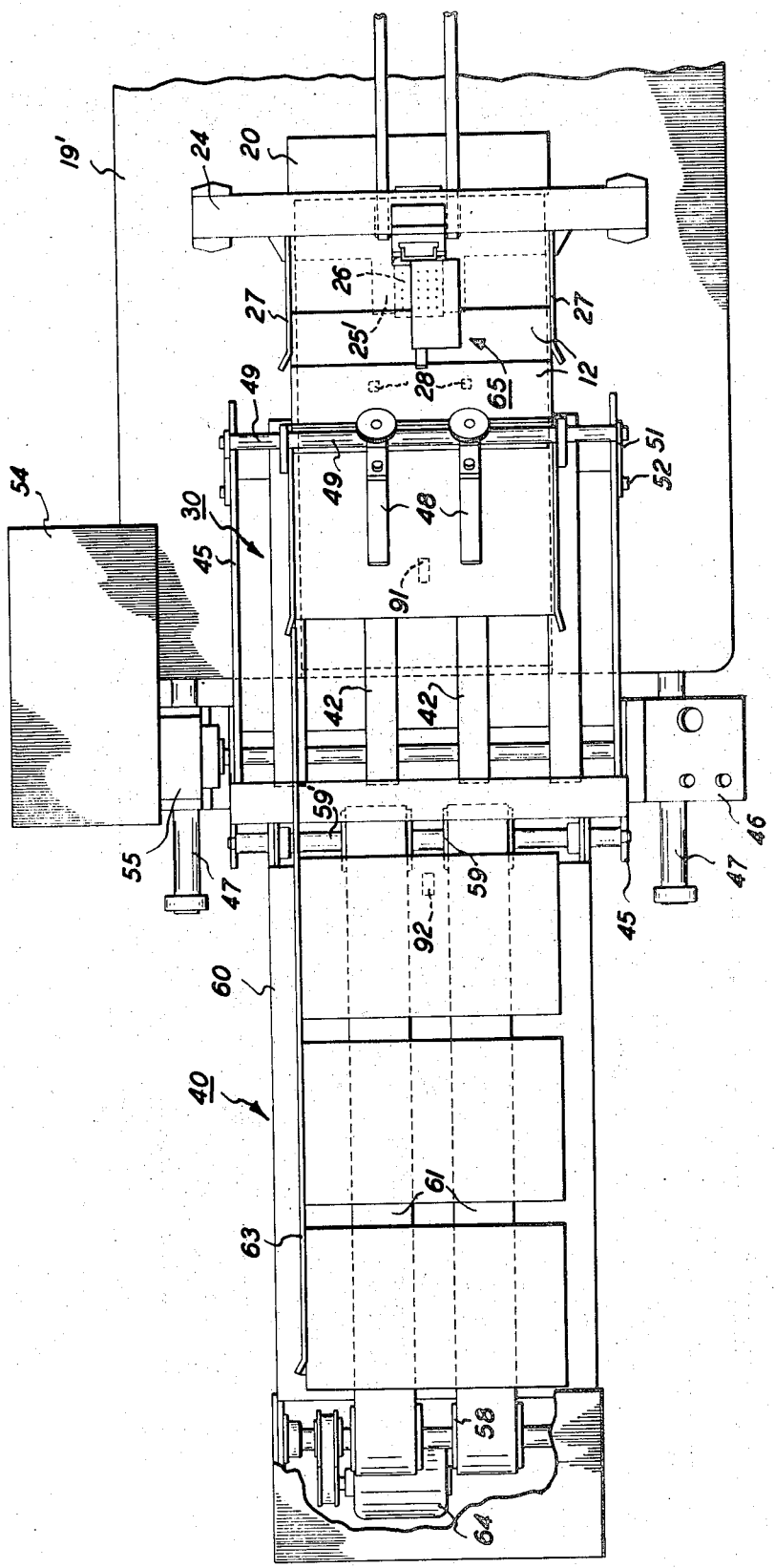
FIG. 2 is a top plan view of the loading apparatus shown in FIG. 1.

Referring to the drawings, there shown the automatic loading or supply apparatus, designated generally by the numeral 10, of the present invention. As will appear, loading apparatus 10 is adapted to automatically maintain a supply of sheet-like articles 12 such as multi-paged documents, newspapers, periodicals, and the like at a work or infeed station 14. In the exemplary arrangement shown, station 14 comprises the inlet to a shuttle type vacuum assisted article feeding apparatus 15. The output of feeding apparatus 15 is operatively associated with a suitable article processor or user, such as a labeling machine (not shown). Preferably discharge conveyor 16 is provided to transport articles discharged by feeding apparatus 15 to the user. It is understood that conveyor 16, is driven by suitable means (not shown).

Loading apparatus 10 includes a suitable support frame or base 19 having a substantially flat top section 19'. A slot-like opening 20 in top section 19' has the feeder shuttle 18 of feeding apparatus 15 disposed therewithin. Feeder shuttle 18 includes a plate-like piece 25 suitably supported for reciprocating movement on frame 19. Shuttle plate 25 has a U-shaped recess 25' adjacent the discharge end thereof to accommodate perforated vacuum pick-up member 26. Pick-up member 26, which communicates with a suitable source of vacuum (not shown) through vacuum line 26', is supported from and jointly movable with shuttle plate 25. The upper surfaces of shuttle plate 25 and pick-up member 26, which are substantially flush with top section 19', form a base on which articles awaiting feeding at infeed station 14 rest.

Suitable means such as crank 21 may be provided for reciprocating feeder shuttle plate 25. A pair of upstanding article engaging drivers 22 are provided on shuttle plate 25. As can be understood, drivers 22, on forward movement of shuttle plate 25, contact the trailing edge or side of the bottommost article and propel the article forward to conveyor 16.

To prevent feed of more than one article at a time by shuttle 18, a discharge gate 23 is provided. Gate 23 which may be rectangular in shape, is suitably supported above shuttle 18 by retainer 24 adjacent the inlet to conveyor 16, the lower edge of gate 23 being spaced from shuttle 18 by a distance selected to limit feed to one article at a time. Gate 23 is preferably mounted for vertical adjusting movement to enable the size of the slot-like opening defined by gate 23 and the top of shuttle 18 to be varied to accommodate changes in the thickness of the articles being fed. While the discharge gate is illustrated as being vertical, it will be understood that gate 23 may be inclined.

While a shuttle or reciprocating type feeding apparatus is described, other types of feeding apparatus such as rollers, endless conveyors, etc. may be contemplated.

A pair of upstanding members 27 are supported from base 19 on either side of shuttle 18, members 27 serving to limit the width of input station 14 and maintain the articles being fed in alignment on shuttle 18. Members 27 are preferably arranged for limited transverse adjusting movement to enable the effective width of the input station 14 to be varied in accordance with changes in the width of the articles being fed. Vertical guides 28 are disposed between belts 42 of shingling conveyor 38. Guides 28, which are supported by conveyor frame member 39 are arranged slightly within the periphery of conveyor belts 42 at the return or discharge end of conveyor 38. Guides 28 serve to prevent backward movement of articles awaiting feeding at input station 14 when shuttle 18 is retracted.

Loading apparatus 10, which serves to automatically maintain a predetermined number of articles at infeed station 14 includes shingling conveyor 38 and preferably supply conveyor 40. Shingling conveyor 38 comprises plural endless belts 42 supported on drive and idler rollers 43, 44 respectively. Conveyor rollers 43, 44 are suitably journaled in conveyor frame side rails 45. Frame 39 of conveyor 38 has depending journaling members 46 adapted to slidably receive rod-like support members 47 of base 19, members 46, 47 cooperating to support conveyor frame 39 on base 19. The relative sliding motion accommodated by members 46, 47 enables the spacing between the discharge end of conveyor 38 and discharge gate 23 to be varied to accommodate changes in the width of the articles being fed.

Shingling conveyor 38 is disposed above the level of base top section 19' and hence articles carried by conveyor 38 are discharged downwardly onto feeder shuttle 18 at infeed station 14. As will appear, article supply control 65 serves to maintain a predetermined supply of articles at infeed station 14, control 65 serving to terminate operation of conveyor 38 when the level of the stack of articles awaiting feeding at station 14 is equal to or slightly above the mean height of conveyor 38 as represented by the plane 53 extending through the axes of drive and idler rollers 43, 44 and to start conveyor 38 when the stack level falls slightly below plane 53. Through this arrangement, belts 42 of conveyor 38 normally lightly rub or bear against the topmost article (s) at infeed station 14 to jog the stack of articles awaiting feeding at station 14 and, in cooperation with gate 23 and side and rear members 27, 28 respectively, help hold the articles in alignment.

A pair of spaced shingling gates 48 are disposed above conveyor 38, the lower edges thereof cooperating with belts 42 to form slot-like passages through which articles carried by conveyor 38 to infeed station 14 pass. Gates 48, which are preferably inclined, are supported from transversely extending rod 49 by journals 50. Preferably, gates 48 are arranged for limited longitudinal adjusting movement on journals 50 to enable the height of gates 48 to be varied. Rod 49 is suitably supported by upstanding wings 51 secured to conveyor side rails 46 for limited horizontal adjusting movement. Locking screws 52 serve to maintain gates 48 in selected angular position on rod 49. As will appear, gates 48 serve to rearrange stacked articles carried by conveyor 38 into shingled or overlapping relationship.

Clutch 55 is provided to selectively couple driving motor 54 with rollers 43 of shingling conveyor 38. Preferably, clutch 55 comprises an electromagnetic type clutch having an operating coil 56 therefor.

To enhance the effectiveness of loading apparatus 10, supply of conveyor 40 is provided. Conveyor 40 includes a pair of drive and idler rollers 58, 59 suitably journaled in frame side rails 60 of conveyor 40. One or more endless belts 61 are stretched over rollers 58, 59. Conveyor 40, which comprises an integral unit, is preferably attached at the discharge end thereof to shingling conveyor 38 as by journaling shaft 59' of conveyor idler rollers 59 in frame side rails 45 of conveyor 38. Legs 62 support the outboard end of supply conveyor 40. As will be understood, the discharge end of conveyor 40 is disposed proximate the inlet of shingling conveyor 38 so as to assure uninterrupted transfer of articles which may be in the form of stacks 13 from supply conveyor 40 onto shingling conveyor 38. Backstop 63 may be provided along one side of conveyor 40 to assist in the loading of articles thereon.

Supply conveyor 40 includes a suitable driving motor 64 operatively coupled to roller 58 thereof. Conveyor driving motors 54, 64 are preferably arranged to drive shingling conveyor 38 and supply conveyor 40 respectively at a speed such that conveyors 38, 40 supply articles to infeed or input station 14 at a rate greater than the article feeding rate of feeding apparatus 15.

Figure 3:
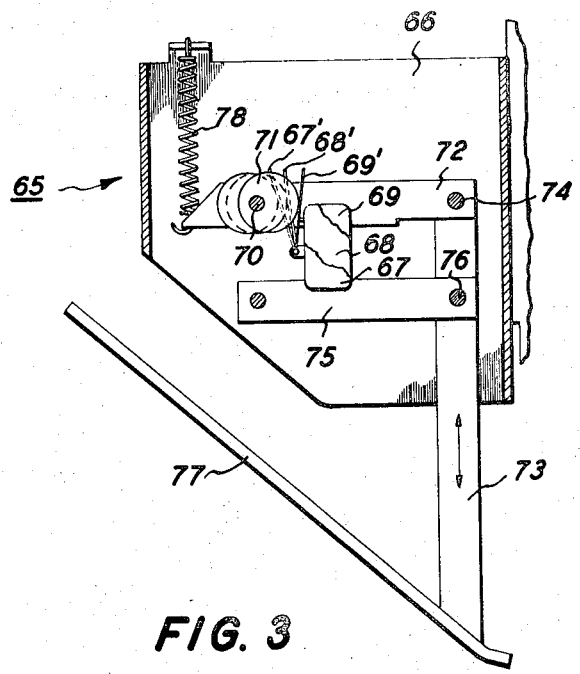
FIG. 3 is an enlarged sectional view showing details of the article supply control for the apparatus shown in FIG. 1.

Referring particularly to FIG. 3 of the drawings, supply control 65, which is disposed at input station 14 of feeding apparatus 15, regulates operation of loading apparatus 10 in accordance with the demands of the user, and more immediately, with the demands of feeding apparatus 15. Supply control 65 includes a suitable housing 66 supported adjacent the inside wall of discharge gate 23 for limited vertical adjusting movement by retainer 24. Automatic stopping, low article supply, and high article supply switches 67, 68, 69 respectively are suitably disposed within housing 66.

A switch actuating shaft 70, having cam type switch operators 71 for switches 67, 68, 69 is suitably journaled in housing 66. Cam operators 71 are operatively disposed proximate each of the switch operating arms 67', 68', 69' respectively. Operating link 72 for shaft 70 has depending arm 73 pinned thereto at 74. Supporting link 75, which is pivotally mounted in housing 66 below and in alignment with the axis of shaft 70, is pinned to arm 73 at 76. As can be understood, this construction comprises in effect a parallelogram type linkage system adapted on raising or lowering motion of arm 73 to rotate switch shaft 70.

Arm 73 has inclined sensing member 77 secured to the lower end thereof above feeder shuttle 18. Sensing member 77, which is adapted to rest on the topmost one of the articles awaiting feeding at input station 14, serves to turn shaft 70 to selectively operate, by means of cams 71, switches 67, 68, 69 respectively in accordance with changes in the number of articles awaiting feeding at infeed station 14. Spring 78 may be provided to assure contact of sensing member 77 with the topmost article resting on feeder shuttle 18.

Figure 4:
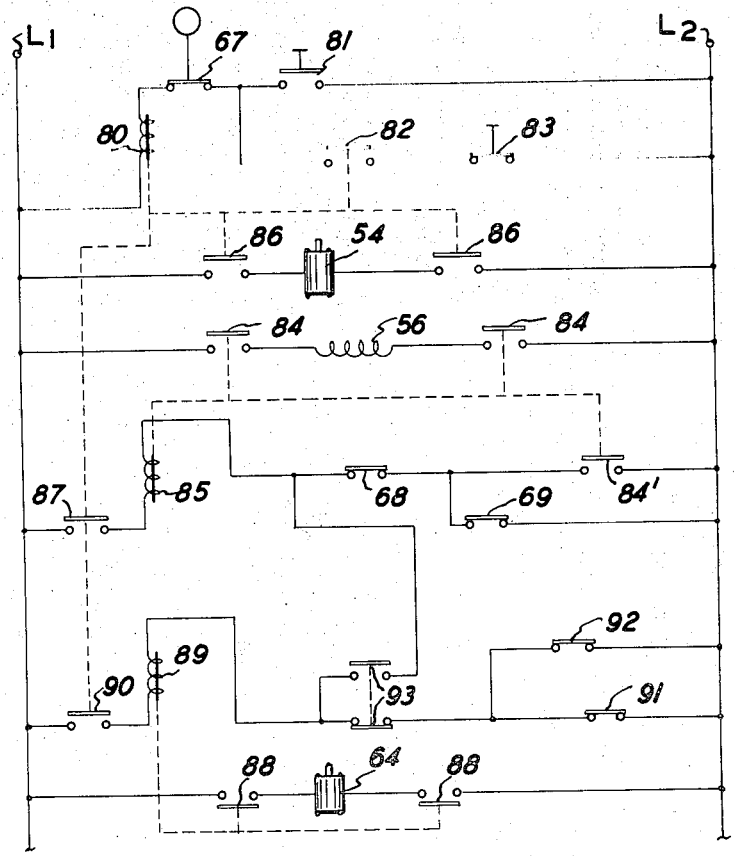
FIG. 4 is a circuit diagram for the loading apparatus shown in FIG. 1.

Referring particularly to FIG. 4 of the drawings, a suitable source of alternating current power, designated by leads $L_1$ $L_2$, is provided. It is understood that a three phase source of electrical power may be used if the circuit is suitably modified.

Stop-start relay 80 is series connected with automatic stopping switch 67 and manually operated start switch 81 across leads $L_1$ $L_2$. Holding contact 82 of relay 80 and normally closed stop switch 83 are in parallel with start switch 81. Start and stop switches 81, 83 are adapted to be manually operated while stopping switch 79 comprises any suitable switch device of the type adapted when opened to automatically reclose following a predetermined interval.

Operating coil 56 for shingling conveyor driving clutch 55 is connected through contacts 84 across leads $L_1$, $L_2$. The controlling relay 85 for contacts 84 is connected in series with contact 87 of relay 80 and supply control switches 68, 69 across leads $L_1$ $L_2$. Holding contact 84' of relay 85 parallels switch 69. Driving motor 54 of shingling conveyor 38 is connected through contacts 86 of start-stop relay 80 across leads $L_1$ $L_2$.

Driving motor 64 for supply conveyor 40 is connected through contacts 88 across leads $L_1$, $L_2$. The controlling relay 89 for contacts 88 is connected through contact 90 of relay 80 and shingling conveyor sensor switch 91 across leads $L_1$, $L_2$. Discharge sensor switch 92, which is disposed proximate the discharge end of supply conveyor 40, parallels switch 91.

To enable loading apparatus 10 to accommodate a preshingled input of articles, a mode control switch 93 is provided, switch 93 serving when closed, to connect controlling relay 89 in series with low and high article supply switches 68, 69 across leads $L_1$, $L_2$. As will be understood, mode control switch 93 bypasses sensor switches 91, 92 to place operation of supply conveyor 40 under supply control 65.

At start-up of the loading apparatus 10, a supply of articles to be fed, which may be in the form of one or more stacks 13, are placed on supply conveyor 40. Start switch 81 is momentarily closed to complete, through the normally closed switch 67, an energizing circuit to relay 80. Relay 80 closes contacts 82, 86, 87, 90 thereof, contact 82 completing through stop switch 83 and delay switch 67 a holding circuit to relay 80. Closure of contacts 86 starts motor 54 while closure of contacts 87, 90 readies shingling and supply conveyors 38, 40 respectively for operation.

Assuming the discharge end of supply conveyor 40 to be empty of articles, sensor switch 92 is closed to complete, through contact 90, an energizing circuit to control relay 89. Relay 89 closes contacts 88 to energize supply conveyor driving motor 64. Conveyor 40 accordingly carries the articles placed thereon forward in procession toward shingling conveyor 38. As the leading stack 13 of articles approaches the discharge end of supply conveyor 40, switch 92 opens. Assuming shingling conveyor 38 to be empty, sensor switch 91 is closed and accordingly relay 89 is held energized and supply conveyor 40 remains operative. Conveyor 40 therefore feeds the leading stack of articles onto shingling conveyor 38.

At start up of loading apparatus 10, infeed station 14 is presumed to be empty. Sensing member 77 of supply control 65 is accordingly in the lowermost position and cam 71 holds switch 69 closed. On closure of contact 87, a circuit is completed through contact 87 and switches 68, 69 energizing control relay 85. Relay 85 closes contacts 84 to energize coil 56 and actuate clutch 55. Clutch 55 couples drive rollers 43 with motor 54. Shingling conveyor 38 is accordingly operated to feed articles transferred thereto from supply conveyor 40 to infeed station 14.

As the leading stack of articles passes from supply conveyor 40 onto shingling conveyor 38, switch 92 recloses to maintain conveyor 40 operative and carry the next succeeding stack of articles forward. As the next stack of articles approaches the discharge end of supply conveyor 40, sensor switch 92 is opened interrupting the energizing circuit to control relay 89 and de-energizing driving motor 64. It is understood that the preceeding stack of articles, which was transferred from supply conveyor 40 onto shingling conveyor 38, holds sensor switch 91 open. Where the supply of articles on either shingling conveyor 38 or at the discharge end of supply conveyor 40 is exhausted, the sensor switch 91 or 92 associated therewith remains closed and supply conveyor 40 is held operative.

As the supply stack moves along on conveyor 38, the stack abuts stationary shingling gates 48 which impede further movement thereof. The frictional relationship between the bottom article of the supply stack and conveyor feed belts 42 carries the bottom article out from under the stationary stack and under gates 48 toward input station 14. As the lowermost article slides out from under the stack, the next overlaying article comes into progressively greater contact with the moving conveyor belts 42 and, on the establishment of a predetermined frictional relationship with the conveyor belts 42, is fed forward with the first article. Due to the delaying action of gates 48, the second article partially overlays or is shingled with the first article. The remaining articles of the stack are similarly re-arranged through the action of gates 48 and the moving conveyor belts 42 into shingled relationship whereby an uninterrupted procession of articles passes from under gates 48 to infeed station 14.

Since conveyors 38, 40 are preferably operated at a speed greater than the feeding speed of feeding apparatus 15, a gradually increasing stack of articles is generated at infeed station 14. As the buildup of articles awaiting feeding at station 14 increases, sensing member 77 of supply control 65 moves upwardly turning the switch operating shaft 70 to first open low article supply switch 69, and later high article supply switch 68. Opening of switch 68 interrupts the energizing circuit to control relay 85, opening contacts 84, 84' and disengaging clutch 55. Shingling conveyor 38 is accordingly stopped.

As the supply of articles at infeed station 14 is used up by feeder shuttle 18, which feeds the bottommost one of the articles forward under discharge gate 23 to conveyor 16, the level of the stack of articles at infeed station 14 falls. Where the level of the articles at infeed station 14 drops slightly below the level of plane 53, cam 71 of supply control 65 closes switch 69 to re-energize control relay 85. As described, relay 85 actuates clutch coil 56 to engage clutch 55 and operate shingling conveyor 38. It is understood that switch 68 is closed by the cam 71 associated therewith following an initial slight decrease in the level of the stack of articles awaiting feeding at infeed station 14.

When the stack of articles on shingling conveyor 38 is exhausted, sensor switch 91 closes energizing control relay 89. Relay 89 closes contacts 88 thereof to energize supply conveyor driving motor 64. Supply conveyor 40 accordingly transfers the next succeeding stack of articles onto shingling conveyor 38 and replaces the transferred stack with a new stack as described heretofore. It is understood that where the last stack of articles on conveyor 40 is transferred onto shingling conveyor 38, sensor switch 92 remains closed to operate supply conveyor 40 continuously.

On feed of the last article from infeed station 14 by feeder shuttle 18, sensing member 77 of supply control 65 descends to the lowermost position to momentarily open stop switch 67 interrupting the energizing circuit to start-stop relay 80. De-energization of relay 80 opens contacts 82, 86, 87, 90 thereof to shutdown loading apparatus 10.

Similarly, manual opening of stop switch 83 by the user interrupts the energizing circuit to start-stop relay 80 to shutdown loading apparatus 10.

Where pre-shingled sheets are inputed to loading apparatus 10, mode switch 93 may be closed to place supply conveyor 40 under the control of low and high article supply switches 68, 69 respectively of supply control 65. At the same time, mode switch 93 bypasses sensor switches 91, 92. Conveyors 38, 40 are therefore started and stopped in unison by supply control 65 in accordance with the demand for articles at infeed station 14.

As described heretofore, article supply control 65 is preferably arranged so that high article supply switch 69 thereof stops shingling conveyor 38 when the level of the articles awaiting feeding at input station 14 is approximately equal to or slightly above plane 53 while low article supply switch 68 is preferably arranged to start conveyor 38 whenever the level of the articles at infeed station 14 falls slightly below plane 53. Inasmuch as the distance between the discharge end of shingling conveyor 38 and gate 23 is preferably substantially equal to or only slightly greater than the length of the articles being fed, the periphery of conveyor belts 42 are normally in contact with the trailing edge (s) of the topmost articles in the stack of articles awaiting feeding at station 14. The contact of the moving conveyor belts 42 with the stack of articles at station 14 tends to vibrate or jog the stack of articles which in cooperation with gate 23 and members 27, 28 tends to align and maintain in alignment the articles at station 14. Additional jogging action is generated by the reciprocating motion of feeder shuttle 18, gate 23 and members 27, 28 cooperating therewith to align the stack of articles awaiting feeding at infeed station 14.

While the invention has been described with reference to the structure disclosed herein, it is not confined to the details set forth; but is intended to cover such modifications, or changes as may come within the scope of the following claims.

What is claimed is:

1. In an apparatus adapted to maintain a supply of articles at the infeed station of an article processor, the combination of:
   transport means for carrying articles forward to said infeed station;
   means adapted to maintain a predetermined supply of said articles at said infeed station, said supply maintaining means including means for actuating said transport means in response to a predetermined low article supply;
   control means adapted to assure input of an uninterrupted stream of articles to said infeed station by said transport means, said control means including shingling means adapted to arrange said articles into predetermined overlapping relationship whereby to provide said stream of articles to said infeed station; and
   second transport means to supply articles to said first mentioned transport means, said control means including first article sensor means for actuating said second transport means in response to a demand for articles by said first transport means;
   said second transport means being adapted to transport stack-like formations of said articles forward to said first transport means, said control means including second article sensor means adapted to hold said second transport means operative at least until one of said article stacks is brought forward by said second transport means to a position adjacent said first transport means whereby to ready said one stack for transfer to said first transport means upon later actuation of said second transport means.

2. The apparatus according to claim 1 in which said control means includes means adapted when actuated to bypass said control means first and second article sensor means and place said second transport means under the control of said article maintaining means when pre-shingled articles are transported forwardly to said first transport means by said second transport means whereby said first and second transport means are operated jointly in response to the demand for articles at said infeed station.

3. In an apparatus adapted to maintain the supply of articles at the infeed station of an article processor, the combination of:
   transport means for carrying articles forward to said infeed station wherein the discharge level of said transport means is higher than the level of said infeed station whereby said articles are stacked one atop the other by said transport means at said infeed station;
   control means adapted to assure input of an uninterrupted stream of articles to said infeed station by said transport means when said transport means is actuated, said control means including shingling means adapted to arrange said articles into predetermined overlapping relationship whereby to provide said stream of articles to said infeed station, said shingling means having at least one inclined shingling gate arranged to intercept articles stacked above a predetermined height on said transport means and in cooperation with said transport means to displace said articles to overlapping relationship;
   said transport means comprising means for jogging the stack of articles at said infeed station whereby to align said articles, said jogging means including means adapted to engage the upper portions of the article stack at said infeed station; and
   said supply maintaining means including means for stopping said transport means in response to a predetermined maximum article supply, said predetermined low and maximum article supplies being chosen so as to facilitate contact of said transport means with the stack of articles at said infeed station and jogging said stack by said transport means.

4. Apparatus according to claim 3 including,
   means for supporting said transport means for adjusting movement toward and away from said infeed station whereby to enable said transport means to be maintained in jogging relationship with the stack of articles at said infeed station on a change in article size.

5. Apparatus according to claim 4 including second transport means operatively associated with said first mentioned transport means for supplying articles to said first transport means, and means enabling said second transport means to be moved in unison with said first transport means whereby to maintain the operative relationship between said first and second transport means undisturbed.

6. The method of maintaining a supply of articles at the infeed station of an article processor having article supply means operatively associated therewith, the steps consisting of:

a. monitoring the supply of articles at said infeed station;

b. actuating the supply means to bring articles forward to said infeed station when the supply of articles at said infeed station is at a predetermined low to assure a continuous supply of articles at said infeed station;

c. assuring single file delivery of articles to said infeed station by the article supply means by passing said articles under shingling gate means so as to rearrange any articles which are stacked one atop the other into over-lapping shingled relationship;

d. stacking said articles at said infeed station one atop the other;

e. terminating steps b, c and d when the supply of articles at said infeed station reaches a predetermined high; and f. maintaining the level of the stack of articles formed at said infeed station within a predetermined range to enable the article supply menas to jog the stack of articles at said infeed means.

* * * * *